Patented Aug. 23, 1932

1,873,937

UNITED STATES PATENT OFFICE

WILHELM LOMMEL, OF WIESDORF-ON-THE-RHINE, THEODOR GOOST, OF LEVERKUSEN-ON-THE-RHINE, AND HERMANN FRIEDRICH, OF WIESDORF-ON-THE-RHINE, GERMANY, ASSIGNORS TO I. G. FARBENINDUSTRIE AKTIENGESELLSCHAFT, OF FRANKFORT-ON-THE-MAIN, GERMANY

ACCELERATOR FOR VULCANIZING RUBBER COMPOUNDS

No Drawing. Application filed September 5, 1930, Serial No. 480,021, and in Germany November 8, 1927.

The present invention relates to a process of vulcanizing rubber compounds and consists in effecting the vulcanization in the presence of an accelerator of the probable formula:

wherein $R_1$ means the cyclohexyl group or a homologue thereof, $R_2$ stands for a hydrocarbon radical which may be linked up with $R_1$ to form a ring configuration. The invention furthermore relates to the vulcanized rubber compounds obtainable by the process above identified.

In accordance with the invention a compound of the above formula is incorporated, for example, by rolling or kneading within the rubber compounds to be vulcanized together with or apart from the other ingredients usually employed in vulcanization processes, such as sulfur, selenium, aromatic nitro compounds + metal oxides or other vulcanizing agents, fillers, plastilizing agents, pigments, etc. Vulcanization of the mixtures thus produced is performed by heating with or without the application of superatmospheric pressure, advantageously to temperatures between about 100–150° C.

It may be mentioned that the term "rubber compound" is intended to include natural rubber varieties and artificial rubber like masses obtainable by polymerizing a rubber forming hydrocarbon, such as butadiene-(1.3) or homologues or analogues thereof alone or in admixture with other suitable compounds capable of being polymerized, such as styrol, vinylnaphthalenes, etc. Obviously, instead of a single one of our vulcanization accelerators, mixtures of two or more of the same may be employed and if desired, accelerators of another type may be used simultaneously.

Instead of the free bases described as accelerators also salts thereof, for example, the carbonates, borates, oleates, stearates, etc. may be employed. These salts show an accelerating action similar to that shown by the bases themselves. They probably dissociate during the vulcanization into acid and base and the latter acts as accelerator in the usual manner. Such salts, therefore, are to be considered as equivalents of the bases in question.

This application is a continuation in part of our copending application Serial No. 240,331, filed December 15, 1927.

The following examples will illustrate the invention without restricting it thereto, the parts being by weight.

Example 1

100 parts of smoked sheets
5 parts of zinc oxide
4 parts of sulfur
1 part of stearic acid
2 parts of ethylcyclohexylamine of the probable formula:

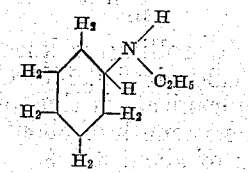

are mixed by rolling or kneading and the mixture is vulcanized at 145° C. for 30 minutes. A vulcanizate is thus obtained showing a tensile strength of about 201 kg/sq cm at a stretch of about 803%.

Example 2

100 parts of smoked sheets
7 parts of sulfur
40 parts of zinc oxide
3 parts of dicyclohexylamine of the probable formula :

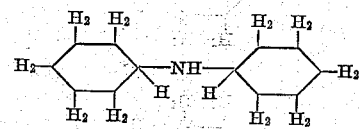

are mixed by rolling or kneading and the mixture is vulcanized at 130° C. for 30 minutes. A vulcanizate is thus obtained showing a tensile strength of about 168 kg/sq cm at a stretch of about 670%.

Example 3

100 parts of smoked sheets
      5 parts of zinc oxide
      4 parts of sulfur
      1 part of stearic acid
      2 parts of dekahydroquinaldine of the probable formula:

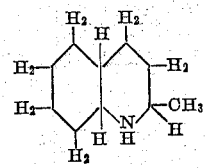

are mixed by rolling or kneading and the mixture is vulcanized at 135° C. for 20 minutes. A vulcanizate is thus obtained showing a tensile strength of about 244 kg/sq cm at a stretch of about 823%.

Example 4

100 parts of butadiene sodium rubber
     60 parts of carbon black
     15 parts of zinc oxide
      2 parts of colophony
      2 parts of tar oil
      2 parts of stearic acid
      2 parts of sulfur
      1 part of perhydromethylindole of the probable formula:

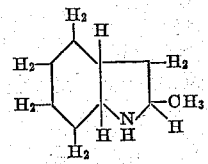

are mixed by rolling or kneading and the mixture is vulcanized at 140° C. for 120 minutes. A vulcanizate is thus obtained showing a tensile strength of about 200 kg/sq cm at a stretch of about 630%.

Similar results will be obtained by replacing the accelerators employed in the above examples, for instance, by:

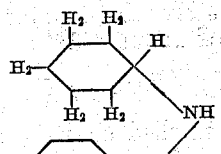

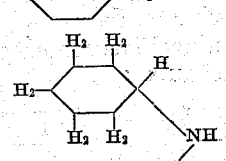

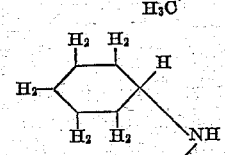

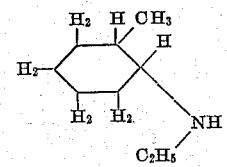

We claim:—

1. Process for the manufacture of vulcanized rubber compounds which consists in effecting the vulcanization in the presence of an accelerator of the probable formula

wherein $R_1$ stands for the cyclohexyl group or a homologue thereof and $R_2$ for a hydrocarbon residue which may be linked up with $R_1$ to form a ring configuration.

2. Process for the manufacture of vulcanized rubber compounds which consists in effecting the vulcanization in the presence of an accelerator of the probable formula

wherein $R_1$ stands for the cyclohexyl group and $R_2$ for alkyl group which may be linked up with $R_1$ to form a ring configuration.

3. Process for the manufacture of vulcanized rubber compounds which consists in effecting the vulcanization in the presence of an accelerator of the probable formula

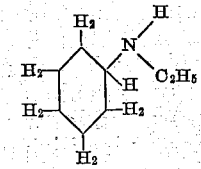

4. Process for the manufacture of vulcanized rubber compounds which consists in effecting the vulcanization in the presence of an accelerator of the probable formula

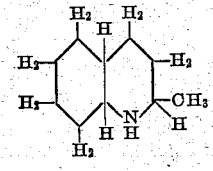

5. Process for the manufacture of vulcanized rubber compounds which consists in effecting the vulcanization in the presence of an accelerator of the probable formula

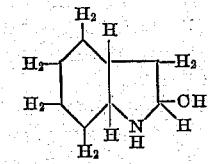

6. As new products of manufacture vulcanized rubber compounds obtainable according to claim 1.

7. As new products of manufacture vulcanized rubber compounds obtainable according to claim 2.

8. As new products of manufacture vulcanized rubber compounds obtainable according to claim 3.

9. As new products of manufacture vulcanized rubber compounds obtainable according to claim 4.

10. As new products of manufacture vulcanized rubber compounds obtainable according to claim 5.

In testimony whereof, we affix our signatures.

WILHELM LOMMEL.
THEODOR GOOST.
HERMANN FRIEDRICH.